Sept. 10, 1929.  A. W. MITCHELL  1,727,933
LAUNDRY MACHINE CLUTCH
Filed Oct. 12, 1927  2 Sheets-Sheet 1
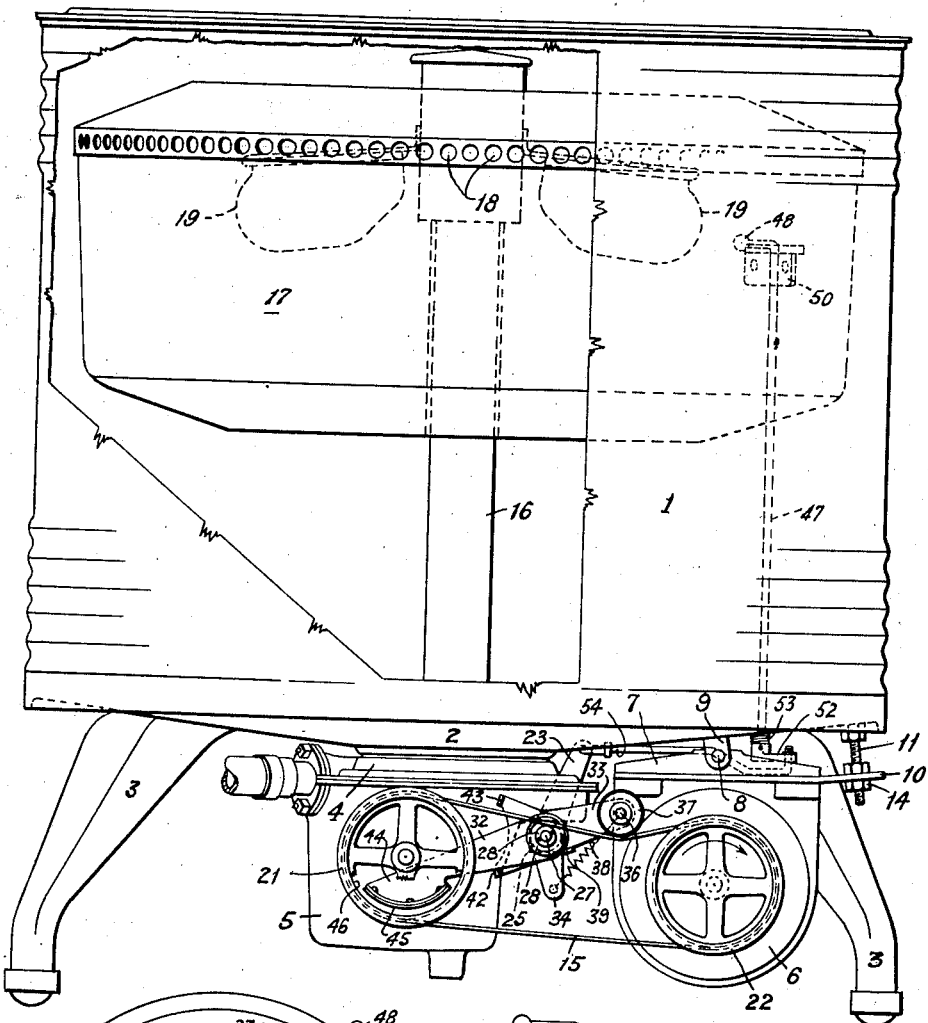
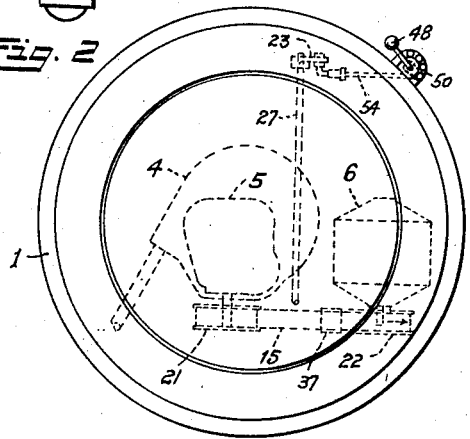
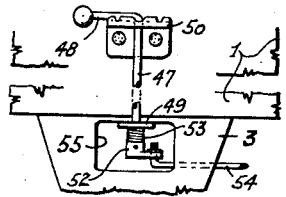
INVENTOR.
Albert W. Mitchell
BY Albert M. Austin
ATTORNEY

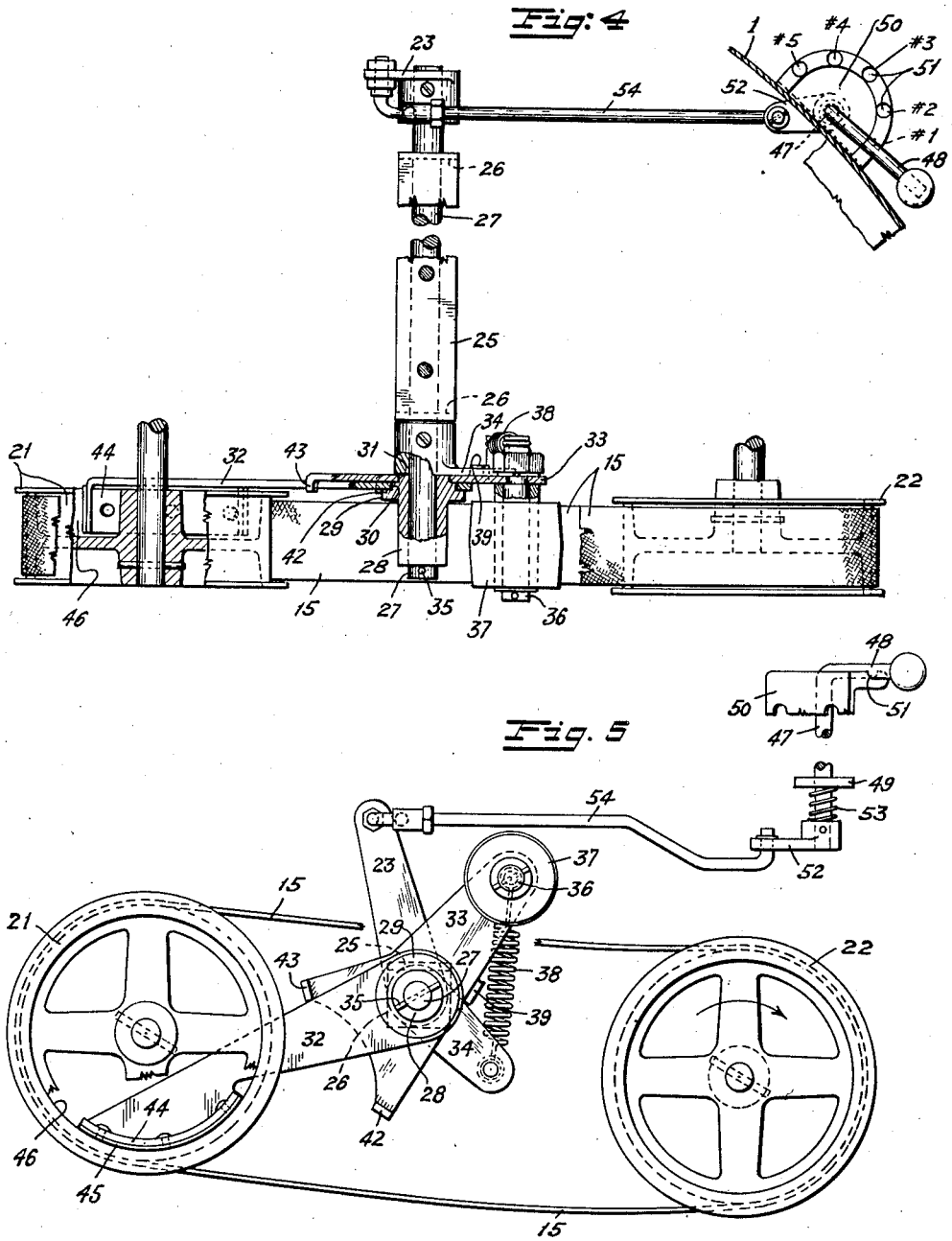

Patented Sept. 10, 1929.

1,727,933

UNITED STATES PATENT OFFICE.

ALBERT W. MITCHELL, OF NEW HAVEN, CONNECTICUT, ASSIGNOR TO THE WHIRL-DRY CORPORATION, OF NEW HAVEN, CONNECTICUT, A CORPORATION OF NEW YORK.

LAUNDRY-MACHINE CLUTCH.

Application filed October 12, 1927. Serial No. 225,642.

The invention relates in general to means for connecting and disconnecting driven devices and a source of power, and more particularly to a clutch arrangement for a laundry machine.

In motor driven appliances, such as laundry machines and other household devices, it is desirable to have the driving motor up to speed before applying the load, since the motors usually employed for this sort of work have a low starting torque. It, therefore, becomes desirable to have a simple clutch arrangement for connecting the motor and driven mechanism, which will connect the load gradually; which can be adjusted so as to run the load at different speeds and which will slip under overload and thereby prevent breaking of parts.

According to the invention a construction is provided having the above desirable characteristics, and also additional features of advantage hereinafter pointed out. The improved clutch arrangement utilizes a driving pulley and a driven pulley having a belt thereon. An idler pulley is provided to bear on the tight side of the belt, the parts being so arranged that, when the idler pulley is exerting no pressure on the belt, no power is transmitted. Suitable mechanism is provided for varying the pressure of the idler pulley on the belt, this varying the belt slippage and consequently the power transmitted. The clutch arrangement may also include a brake operable to bring the driven mechanism quickly to a stop when the power is disconnected.

This arrangement is particularly desirable for use with a laundry machine especially of the type having a centrifugal extractor which, when filled with clothes, has considerable momentum and ordinarily takes considerable effect to both start and stop. However, the clutch arrangement is not limited to any particular type of laundry machine nor to any other particular appliance, but may be used anywhere that its novel and effective properties may be utilized to advantage.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of a well-known type of laundry machine with the invention applied thereto, parts being broken away for purposes of illustration;

Fig. 2 is a top plan view of the machine;

Fig. 3 is a detail showing the mounting of the control devices;

Fig. 4 is a plan view of the clutch arrangement with most of the laundry machine omitted for clearness; and Fig. 5 is a side elevation of the clutch arrangement shown in Fig. 4.

In the following description and in the claims parts will be identified by specific names for convenience, but they are intended to be as generic in their application to similar parts as the art will permit.

Like reference characters denote like parts in the several figures of the drawings.

Referring now to the drawing, the invention is shown applied to a well-known type of laundry machine, it being understood that this disclosure is for purposes of illustration only. Referring more particularly to Fig. 1, the laundry machine comprises a cylindrical tank 1 having a heavy conical bottom 2 supported by a plurality of legs 3. Suspended from the bottom 2 is a horizontally disposed centrifugal pump 4 from which, in turn, is suspended a gear box 5 having suitable gearing therein for operating the several laundry mechanisms. Also suspended from the bottom is a substantially constant speed motor 6 having a low starting torque. The motor is provided with a base 7 having pivot connection by a rod 8 with lugs 9 depending from the bottom. The base 7 has an apertured tongue 10 thru which passes a bolt 11 depending from the bottom and having adjusting nuts 14. By this construction the motor 6 may be pivoted about the pivot rod 8 by turning the nuts 14 to adjust the tightness of the belt 15 to best running conditions.

Projecting upwardly from the bottom of the tank is a hollow pedestal 16 on which is journalled an imperforate type receptacle 17 having an imperforate body except for discharge openings 18. Disposed within the receptacle 17 is an agitator 19 comprising a plurality of blades. Suitable shafting extends through the pedestal 16 from the gear box 5, and suitable clutch devices are provided for selectively connecting the shafting to the agitator 19 for washing, and to the receptacle 17 for centrifugal extraction.

The particular construction of the laundry machine, the clutch device and of the gearing in the gear box forms no part of the present invention, it being sufficient for the purpose of the present disclosure to know that rotation of the driven pulley 21 on the gear box will cause the agitator to oscillate or the receptacle to continuously rotate according to the position of the clutch device.

The driven pulley 21 on the gear box and the driving pulley 22 on the motor may be flanged to insure that the transmitting belt 15 will not slip off even though quite loose. The belt 15 is quite loose on the pulleys when no power is transmitted.

Suitably supported from a portion of the gear box 5 is a flat strip 25 having depending ears 26 in which is journaled a rock shaft 27. Fixedly mounted at one end of the rock shaft is an arm 23. Loosely mounted on the other end of the rock shaft 27 is a sleeve 28 having a flange 29, a large seat 30 and a small seat 31. Loosely mounted on the large seat 30 is a brake arm 32 and loosely mounted on the small seat is an idler arm 33. An operating arm 34 is fixedly mounted on the rock shaft 27, the sleeve, brake arm and idler arm being held between the cotter pin 35 and the operating arm 34.

At the end of the idler arm is mounted a shaft 36 on which is journaled the idler pulley 37. A coil spring 38 connects the shaft 36 with the end of the operating arm 34. The idler arm 33 has a stop 39 which engages the operating arm 34 and limits the approach of the operating arm to the idler arm. The idler arm 33 also has a pair of stops 42 and 43 adapted to straddle the brake arm. The end of the brake arm is provided with a brake shoe 44 having suitable lining 45 for engaging a brake drum surface 46 on the inner side of the driven pulley 21.

At the side of the tank 1 is suitably mounted a vertical control rod 47 having its upper end bent to form a control handle 48. The control rod 47 is suitably journaled at its lower end in a projection 49 from the tank and at its upper end in a segment member 50 secured to the side of the tank and having a plurality of notches 51. The control handle 48 may be disposed in the several notches for the different operating conditions as hereinafter described.

To the lower end of the control rod 47 is rigidly secured an arm 52, there being a spring 53 between the projection 49 and the arm to prevent rattling and to yieldably hold the control handle in the several notches 51. A suitable connecting rod 54 pivotally connects the two arms 52 and 23 whereby movement of the control handle moves the rock shaft. The adjacent leg 3 is provided with an opening 55 to allow passage of the control linkage.

When the improved clutch arrangement is disconnected, the control handle 48 and the rest of the clutch arrangement will be in the position shown in Figs. 4 and 5, the idler pulley 37 being clear of the belt 15 and the belt being so loose that no power transmission may take place. The brake shoe 44 bears firmly against the brake drum 46. When it is desired to transmit power, the control handle will be swung to the second notch, causing the idler pulley to engage lightly the tight side of the belt. This takes some of the slack out of the belt and also increases the wrap of the belt around the pulleys. It will be seen that with the control handle in the third and fourth notches, the tension on the coil spring 38 will be increased which will cause the idler pulley to bear against the tight side of the belt still more firmly, this taking still more slack out of the belt and increasing the wrap of the belt still further. When the control handle is in its last or fifth notch, the arrangement is such that the pressure of the idler pulley is so great that there is substantially no slippage of the belt, full power being transmitted.

If an overload is suddenly placed on the machine it will be seen that the clutch will operate as an automatic safety device. Under normal load the tight side of the belt will be forced downward by the idler pulley. An increase in load will tend to straighten out the tight side of the belt, this raising the idler pulley against the tension of spring 38 and causing the belt to slacken and to unwrap from the pulleys. Thus an overload automatically causes the belt to slip on the pulleys. This action takes place at any position of the control handle as soon as more load is placed upon the machine than that corresponding to the particular notch 51.

When the control handle is in the position shown in Figs. 4 and 5, the operating lever 34 is pressed against the stop 39 on the idler arm 33 and the stop 43 engages the brake arm 32 to press the brake shoe firmly against the drum. Thus the device also functions as a brake. When the control handle is in full speed position, No. 5, it will be seen that the stop 42 engages the brake arm 32, raising the shoe from the brake drum so that at this speed the brake does not drag. It will be appreciated that the stop 42 may be so arranged that the brake will not drag at any speed except that corresponding to notch No. 1 at which position the brake is applied.

The ability to control the speed of the washing mechanism is important when it is desired to wash light, thin articles which do not require much agitation. It will be understood that, for washing, the imperforate type receptacle 17 is filled with water and clothes, it operating as a stationary tub while the agitator 19 agitates the water and clothes.

The speed control is also important in drying when it is desired to rotate the imperforate type receptacle 17 at a decreased speed to prevent undue vibration. It will be understood that for drying the agitator may be removed from the receptacle 17.

The brake is most advantageous in stopping the centrifugal drier quickly, the step down in gearing between the driven pulley and the receptacle aiding in the braking action. The device is also advantageous because the control lever may be advanced to the full power position, No. 5, immediately even though the imperforate type receptacle is filled with laundry and water. The inherent operation of the clutch arrangement is such that the load will be applied to the motor gradually and that the receptacle will be sped up to full speed smoothly and without any ill effects on the mechanism of the machine or on the motor.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a power transmission device, a driving pulley, a driven pulley, a belt on said pulleys, an idler member on tight side of said belt, means for yieldably holding said idler member against said belt, and means for varying the pressure of said idler member against said belt.

2. In a power transmission device, a driving pulley, a driven pulley, a belt on said pulleys, an idler pulley on the outer tight side of said belt, means for yieldably holding said idler pulley against said belt, and means for varying the pressure of said idler pulley against said belt.

3. In combination, a continuously rotating driving pulley, a driven pulley, a belt riding said pulleys, an idler member at the tight side of said belt, a control shaft, an idler arm loosely mounted on said shaft, an operating arm mounted on said shaft, said idler arm having said idler member at the end thereof, and a spring connecting said idler arm and operating arm.

4. In combination, a continuously rotating driving pulley, a driven pulley, a belt riding said pulleys, an idler pulley at the tight side of said belt, a rock shaft, an idler arm loosely mounted on said shaft, an operating arm fixed to said shaft, said idler arm having said idler pulley journalled at the end thereof, a spring connecting said idler arm and operating arm, a control handle, a notched member for holding said handle in different positions, means operatively connecting said control handle and rock shaft, whereby the pressure of said idler pulley against said belt may be adjusted.

5. In combination, a driving pulley, a driven pulley, an endless belt on said pulleys, and an idler pulley on the tight side of said belt.

6. In a power transmission device, a driving pulley, a driven pulley, an endless belt on said pulleys, and means responsive to the tension of the tight side of said belt for controlling the slack of the belt.

7. In a power transmission device, a driving pulley, a driven pulley, an endless belt on said pulleys, and means responsive to the tension of the tight side of the belt for controlling the power transmitted.

8. In combination, a driving pulley, a driven pulley, an endless belt on said pulleys, and an idler pulley outside the tight side of said belt.

9. In a power transmission device, a driving pulley, a driven pulley, an endless belt on said pulleys, an idler member on the tight side of said belt, and means for yieldably holding said idler member against said belt.

10. In a power transmission device, a driving pulley, a driven pulley, an endless belt on said pulleys, an idler member on the tight side of said belt, and means for varying the pressure of said idler member against said belt.

11. In combination, a continuously rotating driving pulley, a driven pulley having a brake surface, a belt riding said pulleys, an idler member at the tight side of said belt, a control shaft, a brake arm, an idler arm and an operating arm mounted on said shaft, a brake shoe adapted to engage said surface and secured to said brake arm, said idler arm having said idler member at the end thereof, and means whereby rotation of said control shaft one way yieldably controls the pressure of said idler member on said belt and rotation the other way applies said brake shoe to said surface.

12. In combination, a continuously rotating driving pulley, a driven pulley having a brake surface, a belt riding said pulleys, an idler pulley at the tight side of said belt, a rock shaft, a brake arm and an idler arm loosely mounted on said shaft, an operating arm fixed to said shaft, a brake shoe adapted to engage said surface and secured to said brake arm, said idler arm having said idler pulley journalled at the end thereof, a spring connecting said idler arm and operating arm, a first stop means to limit the approach of said idler arm and operating arm, second stop means to limit the approach of said idler arm and brake arm, a control handle, means operatively connecting said control handle and rock shaft, whereby the pressure of said idler pulley against said belt and the pressure of the brake shoe on said driven pulley may be controlled selectively.

13. In combination, a continuously rotating flanged driving pulley, a driven flanged pulley having a brake surface, a belt riding said pulleys, an idler pulley outside the tight side of said belt, a rock shaft, a brake arm and an idler arm loosely mounted on said shaft, an operating arm fixed to said shaft, a brake shoe adapted to engage said surface and secured to said brake arm, said idler arm having said idler pulley journalled at the end thereof, a coil spring connecting said idler arm and operating arm, a first stop on said idler arm adapted to engage said operating arm to limit the approach of said idler arm and operating arm, spaced second and third stops on said idler arm straddling said brake arm, a control handle, a notched member for holding said handle in different positions, means operatively connecting said control handle and rock shaft, whereby the pressure of said idler pulley against said belt may be adjusted and the puressure of the brake shoe on said driven pulley may be controlled, selectively.

14. In a power transmission device, a driving pulley, a driven pulley, an endless belt riding on said pulleys, said belt being sufficiently large so that when loose no power is transmitted, a member adapted to yieldably press and deflect the tight side of said belt toward the loose side, whereby increase in load tends to straighten out said tight side against the pressure of said member to decrease the wrap of said belt around said pulleys.

In testimony whereof I have hereunto set my hand.

ALBERT W. MITCHELL.